Jan. 11, 1955  R. MARIE-ANTOINE CANET  2,699,298
MEASURING AND WINDING MACHINE FOR SIMULTANEOUSLY
FOLDING A PLURALITY OF RIBBONS
Filed May 16, 1951  5 Sheets-Sheet 2
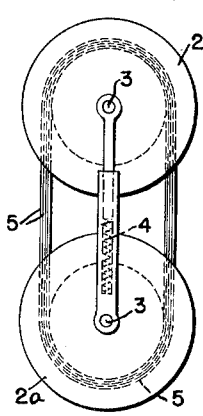
FIG. 2.
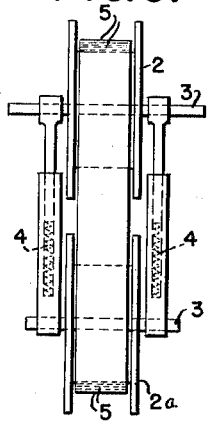
FIG. 3.
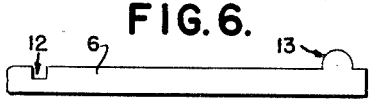
FIG. 6.
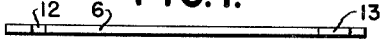
FIG. 7.
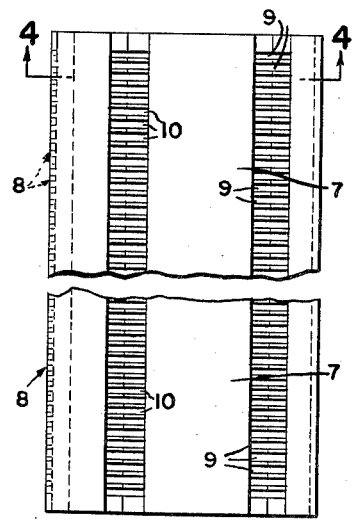
FIG. 4.
FIG. 5.
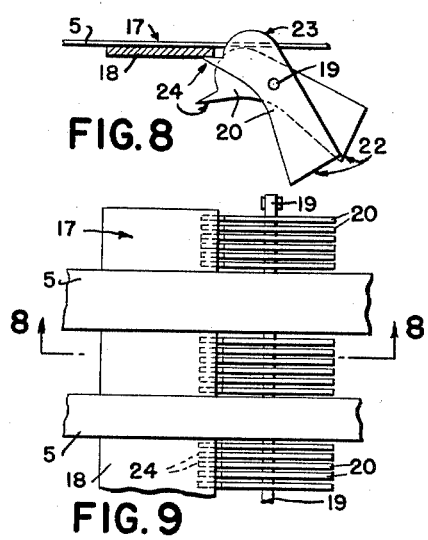
FIG. 8
FIG. 9
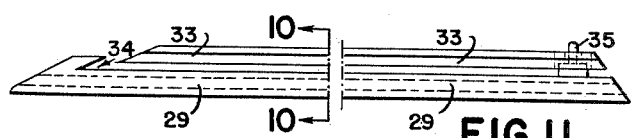
FIG. 11.
FIG. 10.
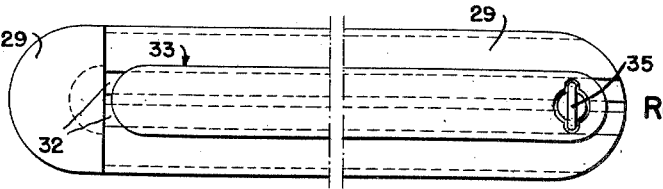
FIG. 12.
INVENTOR
Rene' Marie-Antoine Canet
BY Richardson, David and Nordon
ATTORNEYS INVENTOR
Rene' Marie-Antoine Canet BY Richardson, David and Norton
ATTORNEYS Jan. 11, 1955  R. MARIE-ANTOINE CANET  2,699,298
MEASURING AND WINDING MACHINE FOR SIMULTANEOUSLY
FOLDING A PLURALITY OF RIBBONS
Filed May 16, 1951  5 Sheets-Sheet 4
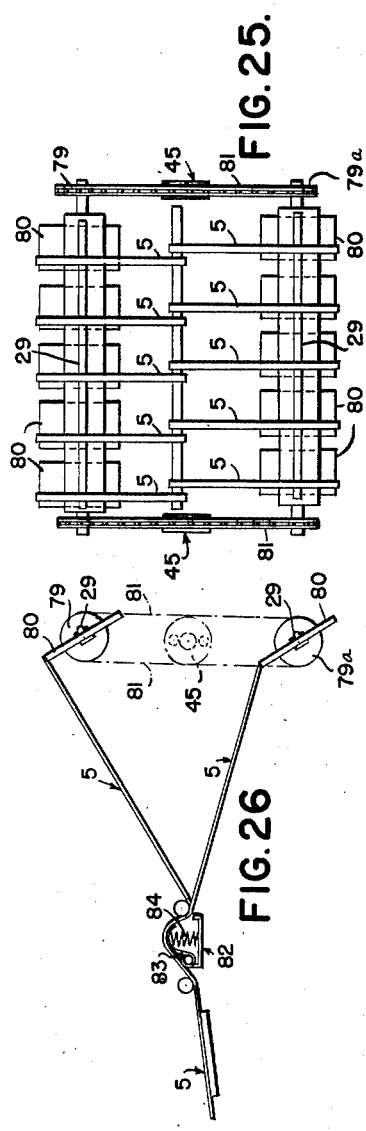
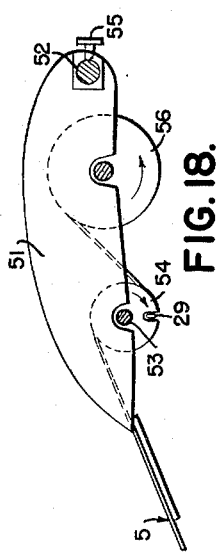
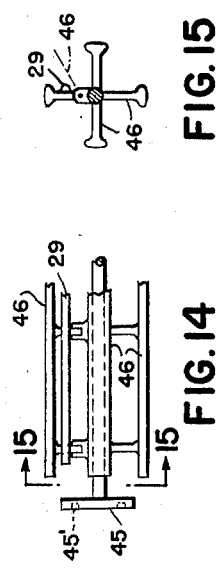
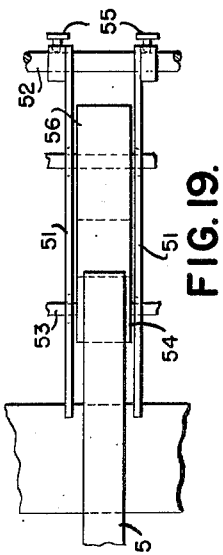
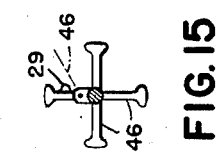
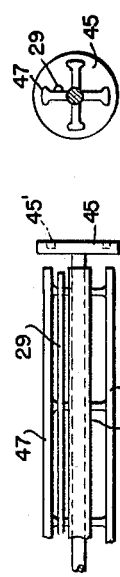
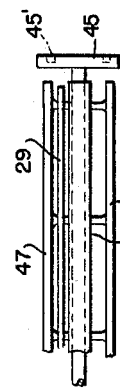
INVENTOR
Rene' Marie-Antoine Canet
BY Richardson, David and Nordon
ATTORNEYS Jan. 11, 1955     R. MARIE-ANTOINE CANET     2,699,298
MEASURING AND WINDING MACHINE FOR SIMULTANEOUSLY
FOLDING A PLURALITY OF RIBBONS
Filed May 16, 1951                                                       5 Sheets-Sheet 5
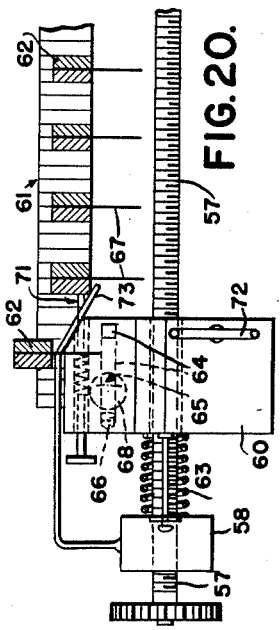
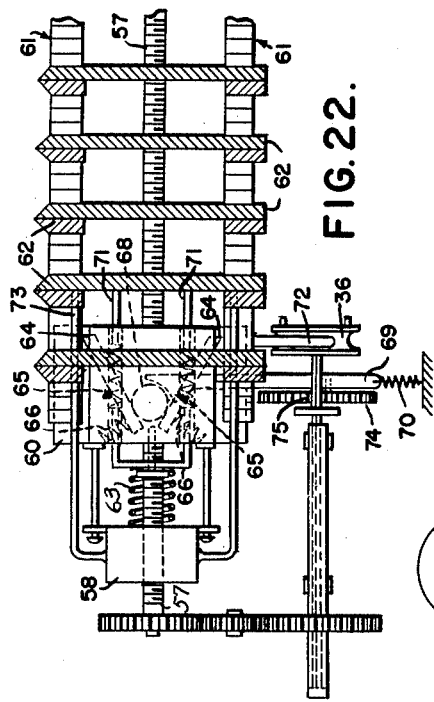
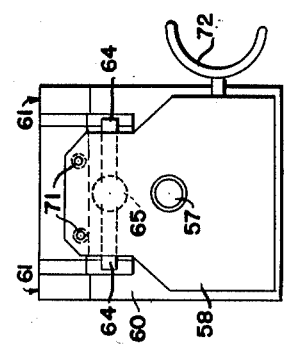
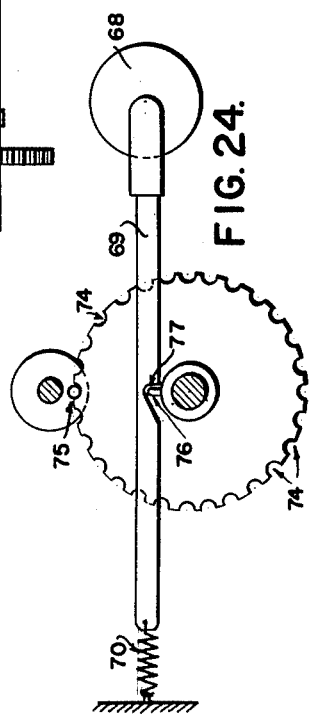
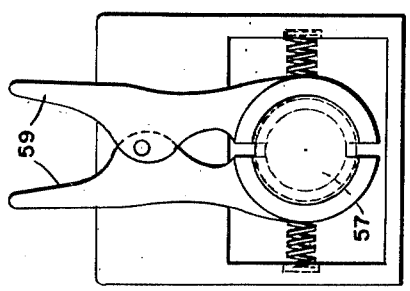
INVENTOR
Rene' Marie-Antoine Canet
BY *Richardson, David and Nordon*
ATTORNEYS United States Patent Office 2,699,298
Patented Jan. 11, 1955

2,699,298

MEASURING AND WINDING MACHINE FOR SIMULTANEOUSLY FOLDING A PLURALITY OF RIBBONS

René Marie-Antoine Canet, Saint-Etienne, France

Application May 16, 1951, Serial No. 226,676

Claims priority, application France June 2, 1950

14 Claims. (Cl. 242—61)

The winding or folding of ribbons is performed nowadays by means of comparatively coarse machines that can handle only one ribbon at a time and require therefore a skilled operator for guiding said ribbon by hand. This leads consequently to a long and costly operation that has been submitted practically to no technical improvements.

My invention has for its object to bring such improvements to the folding of ribbons. It has for its main object a machine adapted to fold simultaneously a plurality of ribbons of equal grade or thickness although their breadth may be different, except however in the case of the folding over strips that require ribbons of equal breadths.

This machine wherein the lateral guiding of the ribbons is performed mechanically allows furthermore any type of folding to be made on it without it being necessary to modify it otherwise than through the incorporation of the desired mandrel or support upon which a previously measured length of ribbon is to be folded by winding. According to my invention, all the ribbons to be positioned on folding supports are brought into the machine under flat conditions with a suitable tensioning and constant spacing.

According to a main feature of the invention, said machine consists of two heads of which one of least is carried by an elastic support which allows it to move nearer the other head with a view to enclosing between the two driving plates provided on said heads the carriers positioned along their axes and over which the ribbons are to be folded.

A further object of the invention consists of a system of arrangements such as vertical reels and rectilinear guides in particular that allow suitably leading and engaging said ribbons for them to be introduced under proper conditions into the actual folding system.

Such conditions allow furthermore in a preferred embodiment associating with said folding means measuring means adapted to measure the length of the ribbons, said measuring means being inserted between the distributing means and the folding means.

My invention will be properly understood from the following description reference being made to accompanying diagrammatic drawings given out merely by way of an exemplification of a machine providing both for the folding and the measuring of the ribbons. In said drawings:

Figs. 2 and 3 are an elevational view of one of the feed reels seen respectively in side and front views.

Fig. 4 is an elevational view partly sectional through line 4—4 of Fig. 5 to show more particularly the reel-carrying plate.

Fig. 5 is a corresponding plan view.

Figs. 6 and 7 illustrate a reel carrier arm seen respectively in side elevational view and in plan view.

Fig. 8 shows a ribbon guiding means in side elevational view through line 8—8 of Fig. 9.

Fig. 9 shows this guiding means in plan view as seen from above.

Fig. 10 is a cross-section, through line 10—10 of Fig. 11, of a clamping ruler.

Figs. 11 and 12 illustrate said ruler respectively in elevational and in plan view.

Figs. 14 and 15 illustrate the case of the folding of a skein, Fig. 15 being a cross-section through line 15—15 of Fig. 14.

Figs. 16 and 17 relate to the so-called English folding.

Figs. 18 and 19 relate to the case of the folding over drums.

Fig. 20 shows in elevation the system for folding over a flat strip.

Fig. 21 is an end view of the device of Fig. 20.

Fig. 22 is a plan view of the carriage seen in Figs. 20 and 21.

Fig. 23 shows, on an enlarged scale, in end elevation, the system for unclutching of the carriage.

Fig. 24 shows on an enlarged scale and in end elevation, the release system shown in the plan view of Fig. 22.

Fig. 25 shows in face elevation the device allowing plural simultaneous folding on plates placed on two different axles.

Fig. 26 is an elevational side view of the arrangement of Fig. 25.

Figures 27, 28:
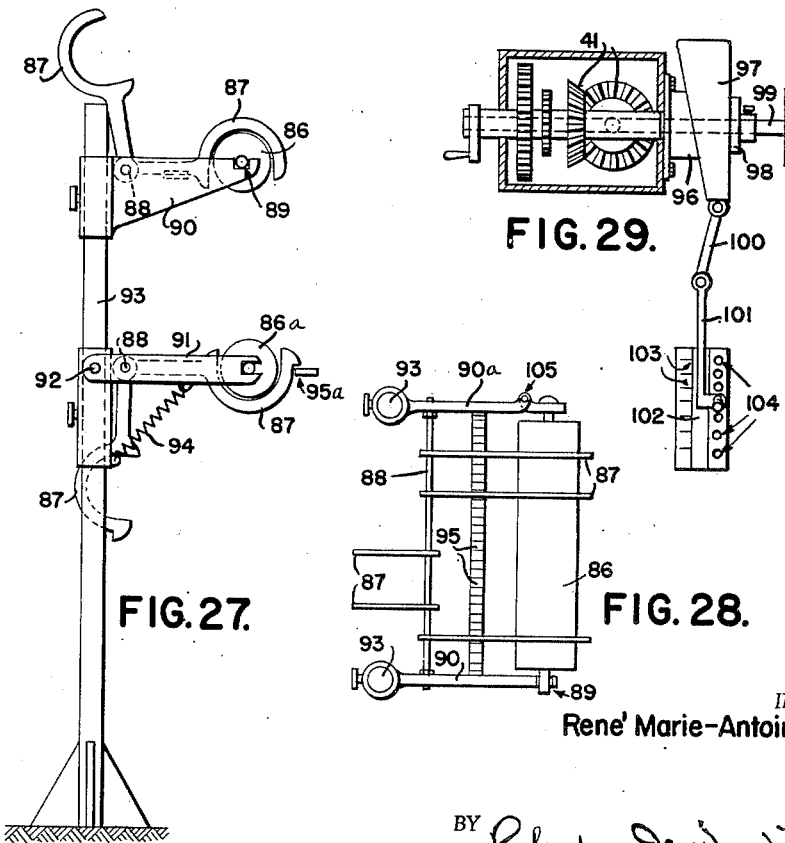

Figs. 27 and 28 illustrate a modification of the feed reel.

Figure 29:
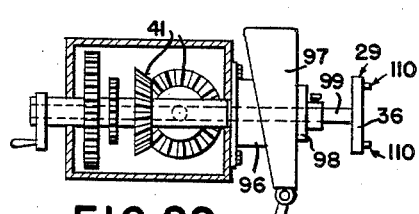

Fig. 29 is a plan view from above of an embodiment of a hand-controlled device for shifting the folding means alongside of a strip.

Figure 1:
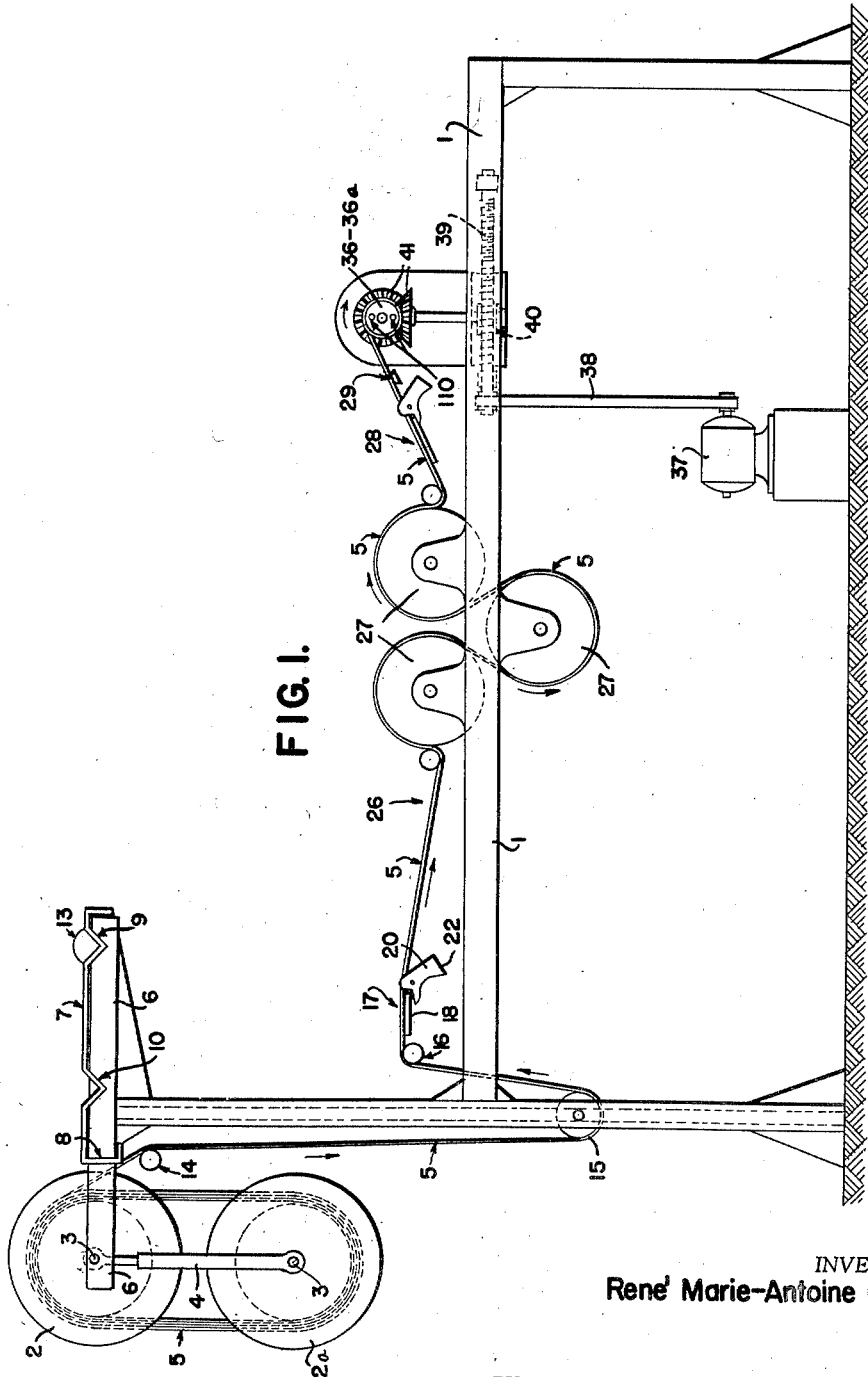
Fig. 1 is a general view of the machine in front elevational view.

My improved machine includes as illustrated in Fig. 1 a frame 1 the length of which is equal to about one meter and in front of which the operator stands. To the frame of said machine are secured in a raised position the feeding reels on the left hand side while the metering means lie over the medial part of the machine and the folding means over the right hand side.

As concerns the reels, they are of interest inasmuch as they have but little inertia and provide a constant tensioning of the skein and prevent any entanglement. Each of said reels includes substantially two flanged spools 2—2a that are interconnected by elastic links 4 that urge said spools apart as illustrated in Figs. 2 and 3. The breadth of these spools between their flanges is but little greater than the breadth of the ribbon 5 they are adapted to hold.

The lower spool 2a of each reel is thus suspended to the upper spool 2 the spindle 3 of which is carried by two parallel horizontal arms 6.

As a series of reels are arranged side by side, I have devised the following arrangement for suitably mounting same according to their number and to the breadth of the ribbon thereon while allowing their easy individual removal with a view to furthering their refilling after the skein is exhausted.

To this end, there is secured horizontally to the frame of the machine and above the table 1 a metal sheet 7 including three series of openings in comb-shape as illustrated in Figs. 4 and 5. Said sheet is bent several times longitudinally as illustrated in Fig. 4 in a manner such that the first series of perforations 8 may extend vertically while the perforations 9 and 10 are V-shaped. The arms 6 (Figs. 6 and 7) carrying the reels are made of blades adapted to slide in said perforations 8 and they are provided at one end with a notch 12 adapted to carry the spindle 3 of the spool 2 forming part of the reel while the other end carries a boss engaging alternatingly a perforation of either series of perforations 9 or 10. When operative, each arm 6 is urged forwardly in order that its boss 13 may engage the perforation 9 aligned with the perforation 8 engaged by the arm, while for reloading purposes, the arms are moved back so that they may be released until the corresponding boss 13 engages a perforation in the series 10.

The reels being thus positioned, it is necessary to provide for the ribbons fed by them the same spacing as that provided between the actual reels.

To this end, after passing over a transverse glass rod 14 and underneath a tension regulating roller 15 adapted to absorb any sudden mismatching between the output of the reels and the capacity of absorption of the machine, the ribbons 5 pass over a further rod 16 and then over a guiding ruler 17 that provides for the relative positioning of said ribbons with reference to one another in an automatic manner without requiring any adjustment for each modification in the number of ribbons or in the breadth of the ribbons, which breadth may furthermore differ for the different ribbons that are folded simultaneously.

This guiding ruler 17 is constituted to this end as illustrated in Figs. 8 and 9 by a plate 18 extending throughout the breadth of the machine and underneath and beyond which is positioned a rod 19 on which are mounted side by side and adapted to rock freely levers 20 forming blades provided with a tail-end 22, a head 23 and a nose 24. The lack of balance of these rocking levers due to the predominating weight of the tail-ends 22 urges their heads 23 above the surface of the plate 18 the underside of which forms a bearing for the noses 24 and limits the rocking movements of said members.

When a ribbon 5 appears above said rocking members as it slides over the plate 18, it causes all the rocking members underlying it to recede, while those projecting to either side of its edges form guides therefor and prevent any lateral shifting of the ribbon. All the ribbons are thus guided and held in place as soon as they reach the frame 1 of the machine.

Before reaching the measuring part of the machine, the ribbons that have been thus guided progress through a free space 26 forming the inspection or finishing table and then after they pass over the adherence and measuring rollers 27 of which three are illustrated in Fig. 1 and that provide for the measuring of the ribbons in association with a revolution meter of any type, which is not illustrated in the drawings.

Beyond the measuring rollers, the ribbons pass over a further guiding ruler 28 that is similar to that 17 positioned ahead of the free space 26 and then over a removable clamping ruler 29 to which the ribbons may be secured.

Said clamping ruler illustrated in detail in Figs. 10 to 12 is made of a thin metal strip assuming cross-sectionally as illustrated the shape of a trapezium; it is hollow and inside the inner angles thereof are wedged two rubber strips 32. The ribbons pass over said ruler and slide freely over it, said ruler including a cover 33 ensuring when positioned over it, a clamping of said ribbons against the rubber strips 32 so as to avoid any sliding through the increase of adherence thus provided. This cover is fitted when in place inside a bevelled notch 34 provided at one end of the ruler while its other end is held fast by a rotary knob 35 engaging an elongated slot in the cover.

Figure 13:
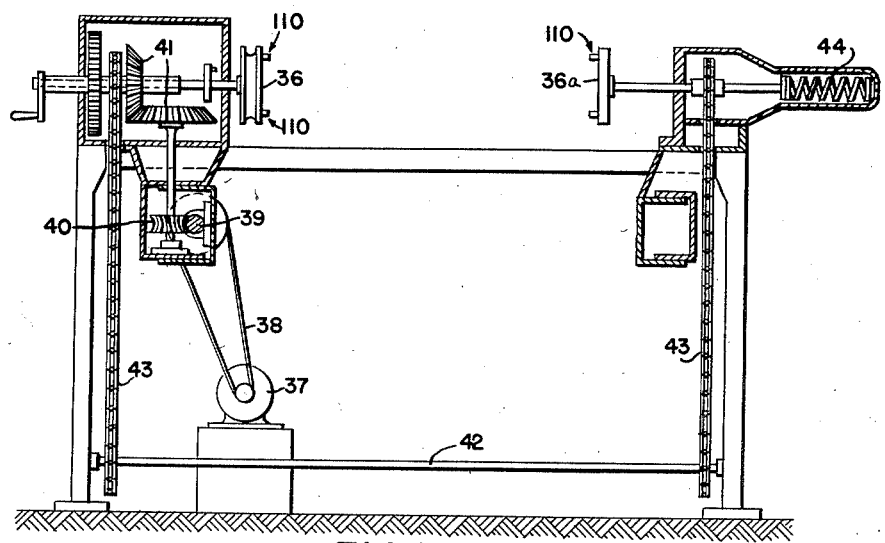
Fig. 13 is a general end elevational view of the means driving the part of the machine that serves for the actual folding.

Beyond this ruler, the operation of which will be disclosed hereinafter, the machine includes cutters or trimmers adapted to cut the ribbons. Further on are provided the actual folding means including as illustrated in Figs. 1 and 13 two axially aligned plates or heads 36 and 36a carrying driving dogs. The plate 36 is driven via dogs 110 into rotation by an electric motor 37 through the agency of pulleys, a belt 38 controlling a worm gear 39—40 and bevel wheels 41. The plate 36a is also driven into rotation at the same speed and in the same direction under control of the spindle carrying the plate 36 through the agency of the transmission shaft 42 and a system of chains and pinions 43.

The spindle carrying the plate 36a is submitted to the action of a spring 44 urging it into the direction of the plate 36.

Between said two plates or heads 36 and 36a are positioned folding means ending also with plates 45 provided with female parts 45' adapted to be engaged by the dogs on the plates 36 and 36a.

Different folding means are provided for each type of folding, but whatever their design may be they include a notch adapted to engage the above described clamping ruler 29 and I will describe said means with further detail hereinafter.

In order to provide for the folding of the ribbons, the clamping ruler 29 is first closed through application of its cover 33, the ribbons are then cut between the said ruler and the folding means and after having positioned an empty folding means between the driving plates 36 and 36a, said ruler 29 is fitted thereon together with the ends of the ribbons clamped therein. An empty clamping ruler is then inserted in the original position of the clamping ruler that has just been removed without its cover being positioned. The machine is then started and stopped as soon as the length measured by the measuring means 27 is reached. The ribbon is then cut after closing the clamping ruler that is then operative and the full folding means are removed from the machine into the hands of the finishing operator. Further folding means are positioned and the next clamping ruler is fitted therein, etc.

Figs. 14 and 15 illustrate partly means for the folding into skein-shape; one of the plates 45 with its female notches 45' and its cross-shaped arms 46 are shown thereon, one of said arms being adapted to carry through the agency of any suitable means the clamping ruler 29.

Figs. 16 and 17 illustrate partly an arrangement for the so-called English folding with its cross arms 47 of which one may carry through any suitable means the clamping ruler 29.

In the case of a folding over a drum with or without an intermediary paper sheet, it is possible to provide for the guiding of the ribbons with a view to their correct winding by means of guiding plates 51 as illustrated in Figs. 18 and 19 that form pivoting flanges that are shiftably carried by a rod 52 parallel with the spindle 53 on which are mounted the drums 54 driven into rotation through any suitable means. After positioning, in accordance with the breadth and spacing of the ribbons, said flanges are secured through locking screws 55. When folding the ribbons over the drums with the interposition of paper sheets, there is provided a roll of insert paper guided and held in position by the same flanges, the guiding ruler 28 providing for the correct positioning of the ribbon.

The folding over strips requires a somewhat different arrangement so that the operation may be performed in a perfectly automatic manner without the operator having to interfere.

As a matter of fact, it is known that this folding requires folding over the edge of the strip a given number of turns, after which the ribbon is shifted by an amount, depending on its breadth, that is such that the second row may lie side by side with the first row, said second row including a predetermined number of turns, this operation being repeated until the desired number of rows has been obtained. The shifting should be increased when it is being produced by an amount such that the beginning of a row begins at the exact location required, after which a slight rearward movement provides for the correct superposition of the turns that are to form the complete row.

The following are the parameters defining the mechanism required for this manner of folding: number of turns in each row—amount of shift between two successive rows—number of rows.

This folding mechanism is housed inside a special casing containing chiefly as illustrated in Figs. 20 to 22 a threaded rod 57 on which is screwed a sleeve 58, the tapped part of this sleeve being divided into two parts that are moved apart by clips 59 submitted to the action of springs that allow their return into inoperative position after operation, as illustrated in Fig. 23. A block 60 that is independent of the threaded rod 57 may slide forwardly and rearwardly in the casing and is connected with the plate driving the folding means through the driving fork 72.

At the upper end of the casing and to each side thereof, a rack 61 carrying a scale of lines serves for measuring the breadth of the ribbon and carries removable jacks 62 interengaging the racks and forming successive stops.

Between the sleeve 58 and the block 60 is inserted a spring 63 that is compressed when the sleeve 58 is constrained to advance through the rotation of the threaded rod 57 whereby said block 60 is urged against the first stop or jack 62 lying in front of it. The block 60 includes two mechanisms:

(a) Two steel blades 64 arranged obliquely to either side of the block are pivotally secured each to a spindle 65. A weak spring 66 located to the rear of the block produces a slight lateral projection of each of the blades 64 that abut thus against two blades 67 rigid with the stops 62 and projecting slightly beyond the rack teeth 61; this holds the block 60 fast. Between the two blades 64 and to the rear of the block a ball 68 engages slightly the blades 64 urged by the spring 66 against it. This ball is held in place by a vertical lever 69 the end of which forms a cam. A rising movement of said lever that is normally attracted downwardly by a spring 70 urges the ball towards the rear of the block and moves apart the blades 64 in antagonism with the springs 66. The projecting parts of the blades 64 to the front of the block recede and the complete block 60 urged rearwardly by the spring 63 compressed by the sleeve 58 jumps forwardly up to the next transverse stop 62.

(b) Two spring abutments 71 located at the upper end of the block 60 engage then the following stops 62 and the springs engaging said abutments 71 allow them to slide transiently inwardly of the block which has for its result by reason of the violent impact produced to make the block progress by a larger amount but with a rearward movement provided by the reaction of the springs acting on said abutments. This forms the transverse shifting movement.

During the forward movement of the block 60, the ball 68 that has moved the blades 64 apart remains through inertia in its rear position but the impact of the block against the following stop provides for a forward movement again through inertia; the blades that have receded project again and urge then the block to engage the blades 67 of the stops 62 defining its second position.

Projections 73 extending above the block together with the sleeve 58 raise slightly the stop 62 that has just served as a first abutment so as to prevent it from hindering the following translational movement. Only the blade 67 of the abutment is long enough for it to continue serving as an abutment for the blades 64 of the block 60.

A revolution meter connected with the shaft driving the folding means allows controlling the release through actuation of the lever 69 that is in contact with the ball 68 held between the blades 64.

This revolution meter is constituted by a wheel including as many notches 74 as there are turns to be made for each row in the folding. A projection 75 on the meter driving shaft provides at every revolution for an angular shifting of the wheel by one notch.

On the shaft of the actual meter is provided a small stud 76 engaging the rod 69 provided to this purpose with a notch 77. The projection 75 on the driving shaft will therefore engage a notch once per complete revolution of the wheel so as to impart to the rod 69 a movement that is sufficient for shifting the ball 68, spacing the blades 64 and releasing thus the block 60 with a view to a further forward movement.

The actual mounting for the folding on strips includes two recessed plates 45 as in the case of the other mountings referred to. Always, folding is simultaneously done upon two mandrels 79 and 79a displaced with respect to the plates 45 and set in rotation after these plates by sprockets and chains 81 (Figures 25 and 26). Upon each of these mandrels is placed a number of cards 80.

As well known in the art, a suitable adjusting device allows adjusting the carrier to the size of the strips.

On the other hand, the beats provided by the folding over the strips as produced by the somewhat considerable difference in the linear speeds of the ribbon that moves away from and towards the axis of rotation twice per turn should be absorbed or at least damped. To this end, there is inserted, for the folding considered, on the folding table a box 82 including a cover 83 in substantial hogbacked shape, that is held in its upper position under the action of the springs 84 contained in said box. The upward and downward rocking movement damps the effects of the beats.

Lastly, by reason of the worm drive of the general folding means, it is possible to move the latter nearer or further away from the folding table along both longitudinal girders of the machine frame, depending on the folding to be executed. Marks provided with securing studs engaging the longitudinal girders allow the correct positioning at the desired distance and the suitable clamping of the said folding means.

To provide for the shifting of the plate 36 and consequently of the strips before the folding of the ribbons, it is also possible, according to a simpler embodiment of the invention, that is however not automatic, to use a hand-operated mechanism of the type illustrated in Fig. 29. The casing containing the bevel pinions 41 carries on its outer wall on the side facing the pulley 36 a wedge-shaped member 96 over which may slide a wedge 97 assuming a complementary shape and abutting against the collar 98 rigid with the spindle 99 of the pulley 36. It is thus easily perceived that, if the wedge 97 is pivotally connected with a lever 100 pivotally connected in its turn with a further lever 101 slidingly held in the slideway 102 inside which its position may be adjusted with reference to the marks 103 through engagement with the notches 104, there is provided, according to the direction of shifting of the lever 101, a shifting in the direction required for the folding or in the opposite direction as required for the return to zero of the spindle 99 and consequently of the pulley 36. Thus it is sufficient to provide for instance the shaft driving the strip-folding means with revolution meter; at the moment at which the number of turns is reached for which the system is to be shifted laterally to begin the next row on the strip, the operator slows down the operation of the machine and when the exact number is reached, the machine is almost stopped and the operator draws inwardly the lever 101 until the latter is shifted by the amount required for the folding of the next row.

Figs. 27 and 28 illustrate a modification of the ribbon feeding reels in a manner somewhat similar to that illustrated in Figs. 18 and 19 for the drum folding means. This modified embodiment provides only one roller per tier as illustrated at 86 and 86a, said roller corresponding to the largest width to be provided for. Each roller is subdivided in conformity with the breadth of the individual ribbons by guiding plates 87 pivotally secured in each tier to a spindle 88 lying parallel with the axis of the corresponding roller and serving as guiding flanges at the desired location where they are held fast; the upper guiding plates are in practice held fast by the notches or racks 95 while the lower guiding plates are held fast by a small ruler 95a adapted to recede through a simple pivotal movement round its axis.

The roller 86 of the upper tier is carried at one end by its spindle revolubly engaging the bearing 89 on the bracket 90 while the corresponding bracket 90a at the other end of the tiers is hinged at 105 to allow shifting and releasing of the roller 86 and consequently an easy positioning of the ribbon skeins. As to the roller 86a of the lower tier, it is carried by two levers 91 pivotally secured at 92 round the stationary axis on the upright 93, the tensioning of the ribbon skeins being thus ensured by the downwardly turning tendency of the roller 86a assisted in this downward movement by the spring 94.

It should be mentioned that when starting of the machine i. e. when bringing the ribbons from the feed reels beyond the measuring means, the clamping ruler 29 is positioned just beyond the guiding ruler 17 and the ribbons are fitted thereto through their ends as provided by the insertion of the cover 33, after which the ruler is engaged in its normal position ahead of the folding means.

Obviously and as readily apparent from the preceding disclosure, the invention is by no means limited to the sole embodiments disclosed hereinabove in a very diagrammatic manner and it covers on the contrary all the modifications thereof falling within the scope of accompanying claims, said modifications relating in particular to the simultaneous or independent driving means for the shaft carrying the measuring roller at 27 and the means controlling the plates 36 and 36a provided with the driving dogs.

What I claim is:

1. In a machine for folding simultaneously a plurality of ribbons, the combination of means for moving the various ribbons forwardly in flat parallel formation under constant tension and constant spacing conditions, means adapted to be slidingly engaged by the ribbons fed by said ribbon-moving means, means adapted to clamp the different ribbons over said last mentioned ribbon-engaged means in the position assumed by them during their engagement by said last mentioned means, the associated last mentioned ribbon-engaged and ribbon-clamping means being removable and adapted to be transported bodily with the ribbons engaged between them, folding means adapted to removably carry the ribbon-engaged means when transported with the ribbon-clamping means, and driving means adapted to operate the folding means prior to removal therefrom of the ribbon-clamping means for folding the ribbons carried by the ribbon-engaged means.

2. In a machine for folding simultaneously a plurality of ribbons, the combination of means for moving the various ribbons forwardly in flat parallel formation under constant tension and constant spacing conditions, a ruler adapted to be slidingly engaged by the ribbons fed by said ribbon-moving means, stationary means on which said ruler is removably carried, a removable cover adapted to clamp the ribbons over the ruler throughout the length of the latter in the positions assumed by them during their engagement by said last mentioned means, the associated ruler and cover being removable and adapted to be transported bodily with the ribbons engaged between them, folding means adapted to removably carry the ruler when transported with the cover, and driving means adapted to operate the folding means prior to removal therefrom of the cover for folding the ribbons carried by the ruler.

3. In a machine for folding simultaneously a plurality of ribbons, the combination of means for moving the various ribbons forwardly in flat parallel formation under constant tension and constant spacing conditions, a ruler assuming cross-sectionally the shape of a trapezium and including a rubber insert, said ruler being adapted to be slidingly engaged by the ribbons fed by said ribbon-moving means, stationary means on which said ruler is removably carried, a removable cover adapted to clamp the ribbons over the rubber insert in the ruler throughout the length of the latter in the positions assumed by them during their engagement by said last mentioned means, the associated ruler and cover being removable and adapted to be transported bodily with the ribbons engaged between them, folding means adapted to removably carry the ruler when transported with the cover, and driving means adapted to operate the folding means prior to removal therefrom of the cover for folding the ribbons carried by the ruler.

4. In a machine for folding simultaneously a plurality of ribbons, the combination of means for moving the various ribbons forwardly in flat parallel formation under constant tension and constant spacing conditions, a longitudinally perforated plate adapted to guide said ribbons fed by said means in parallel formation, freely rocking levers pivotally secured to the underside of the plate and including a rounded head adapted to project through and above the longitudinal perforations in said plate under the action of gravity to form lateral abutments for the ribbons moving alongside of the perforations engaged by the lever, the ribbons, the paths of which register with any perforations, depressing the corresponding rocking levers against the action of gravity, means adapted to be slidingly engaged by the ribbons fed by said ribbon-moving means over said plate, means adapted to clamp the different ribbons over last mentioned ribbon-engaged means in the positions assumed by them during their engagement by said last-mentioned means, the associated last mentioned ribbon-engaged and ribbon-clamping means being removable and adapted to be transported bodily with the ribbons engaged between them, folding means adapted to removably carry the ribbon-engaged means when transported with the ribbon-clamping means, and driving means adapted to operate the folding means prior to removal therefrom of the ribbon-clamping means for folding the ribbons carried by the ribbon-engaged means.

5. In a machine for folding simultaneously a plurality of ribbons, the combination of means for moving the various ribbons forwardly in flat parallel formation under constant tension and predetermined spacing conditions, a plurality of removable interchangeable systems including each a ruler and a clamp removably fitted over the latter for clamping between said clamp and said ruler the various ribbons in their predetermined relative location, a folding system including means for removably holding a ruler in operative position thereon, stationary means adapted to removably hold a ruler between the ribbon-moving means and the folding means, the ruler being adapted, when mounted on said stationary means, to be engaged by the ribbons fed by the ribbon-moving means towards the folding means, and to have the ribbons clamped on it by the cooperating clamp, said ribbons being cut at the output end of the clamp and ruler system held by said stationary means and means removably carrying the folding means and controlling their operation.

6. In a machine for folding simultaneously a plurality of ribbons, the combination of means for moving the various ribbons forwardly in flat parallel formation under constant tension and constant spacing conditions, means adapted to be slidingly engaged by the ribbons fed by said ribbon-moving means, means adapted to clamp the different ribbons over said last-mentioned ribbon-engaged means in the position assumed by them during their engagement by said last mentioned means, the associated last-mentioned ribbon-engaged and ribbon-clamping means being removable and adapted to be transported bodily with the ribbons engaged between them, folding means adapted to removably carry the ribbon-engaged means when transported with the ribbon-clamping means, and driving means adapted to operate the folding means prior to removal therefrom of the ribbon-clamping means for folding the ribbons carried by the ribbon-engaged means and ribbon-measuring means inserted between the ribbon-moving and the ribbon-engaged means.

7. In a machine for folding simultaneously a plurality of ribbons, the combination of means for moving the various ribbons forwardly in flat parallel formation under constant tension and constant spacing conditions, means adapted to be slidingly engaged by the ribbons fed by said ribbon-moving means, means adapted to clamp the different ribbons over said last-mentioned ribbon-engaged means in the positions assumed by them during their engagement by said last-mentioned means, the associated last-mentioned ribbon-engaged and ribbon-clamping means being removable and adapted to be transported bodily with the ribbons engaged between them, folding means adapted to removably carry the ribbon-engaged means when transported with the ribbon-clamping means, and driving means adapted to operate the folding means prior to removal therefrom of the ribbon-clamping means for folding the ribbons carried by the ribbon-engaged means, and means for laterally shifting the folding means carrying the ribbon-engaged and ribbon-clamping means and adapted to operate each time a predetermined number of ribbon turns has been wound.

8. In a machine for folding simultaneously a plurality of ribbons, the combination of means for moving the various ribbons forwardly in flat parallel formation under constant tension and constant spacing conditions, means adapted to be slidingly engaged by the ribbons fed by said ribbon-moving means, means adapted to clamp the different ribbons over said last mentioned ribbon-engaged means in the positions assumed by them during their engagement by said last-mentioned means, the associated last mentioned ribbon-engaged and ribbon-clamping means being removable and adapted to be transported bodily with the ribbons engaged between them, folding means adapted to removably carry the ribbon-engaged means when transported with the ribbon-clamping means, and driving means adapted to operate the folding means prior to removal therefrom of the ribbon-clamping means for folding the ribbons from the ribbon-engaged means and hand-operable means for shifting the ribbons transversely during the folding operation.

9. In a machine for folding simultaneously a plurality of ribbons, the combination of means for moving the various ribbons forwardly in flat parallel formation under constant tension and predetermined spacing conditions, a plurality of removable interchangeable systems including each a ruler and a clamp removably fitted over the latter for clamping between said clamp and said ruler the various ribbons in their predetermined relative location, a folding system including a revoluble carrier, a plurality of radial arms carried thereon, one of which is adapted to carry a ruler in operative position, stationary means adapted to hold removably a ruler between the ribbon-moving means and the folding means, the ruler being adapted, when mounted on said stationary means, to be engaged by the ribbon fed by the ribbon-moving means towards the folding means, and to have the ribbons clamped on it by the cooperating clamp, said ribbons being cut at the output end of the clamp and ruler system held by said stationary means, and means removably carrying the folding means and controlling their operation.

10. In a machine for folding simultaneously a plurality of ribbons, the combination of means for moving the various ribbons forwardly in flat parallel formation under constant tension and predetermined spacing conditions, a plurality of removable interchangeable systems including each a ruler and a clamp removably fitted over the latter for clamping between said clamp and said ruler the various ribbons in their predetermined relative location, a folding system including an elongated member assuming cross-sectionally the shape of a cross adapted to carry the ruler in parallelism with its axis, stationary means adapted to removably hold a ruler between the ribbon-moving means and said folding system, the ruler being adapted, when mounted on said stationary means, to be engaged by the ribbons fed by the ribbon-moving means towards said folding system, and to have the ribbons clamped on it by the cooperating clamp, said ribbons being cut at the output end of the clamp and ruler system held by said stationary means, and means removably carrying said folding system and controlling their rotation.

11. In a machine for folding simultaneously a plurality of ribbons, the combination of means for moving the various ribbons forwardly in flat parallel formation under constant tension and predetermined spacing conditions, a plurality of removable interchangeable systems including each a ruler and a clamp removably fitted over the latter for clamping between said clamp and said ruler the various ribbons in their predetermined relative location, a folding system including two geared parallel spindles extending transversely with reference to the path of the ribbon, a plurality of cards rigid with each of said spindles, on which the ribbons are to be folded, a common drive for the two spindles and means for guiding the different ribbons to the corresponding cards, stationary means adapted to removably hold a ruler between the ribbon moving means and said folding system, the ruler being adapted, when mounted on said stationary means, to be engaged by the ribbons fed by the ribbon-moving means towards said folding system, and to have the ribbons clamped on it by the cooperating clamp, said ribbons being cut at the output end of the clamp and ruler system held by said stationary means, and means removably carrying said folding system and controlling their rotation.

12. In a machine for simultaneously folding a plurality of ribbons, the combination of feeding means for simultaneously moving said ribbons forwardly in flat parallel relationship; a pair of spaced revoluble heads disposed for rotation about a common axis perpendicular to the direction of travel of the ribbons fed by said feeding means; supporting means for said heads permitting axial movement thereof; resilient means yieldingly urging relative axial movement between said heads causing at least one of said heads to approach the other; folding means carried by said heads and adapted for engagement by said ribbons to have said ribbons wound thereon during folding thereof, said folding means extending axially between said heads for rotation therewith; means controlling the rotation of said heads; turn counting means responsive to the amount of rotation of said folding means; and shifting means controlled by said turn counting means and producing an axial displacement of said folding means when a predetermined number of turns have been wound thereupon.

13. The combination according to claim 12, in which said shifting means comprises: a block movable in a direction parallel to the common axis of said heads; a plurality of spaced stops successively engageable by said block and defining successive positions to be assumed by said block; spring means urging said block to move into successive engagement with said stops; and means for successively releasing said engagement with repect to each stop, whereby said block moves into engagement with the next stop.

14. In a machine for simultaneously folding a plurality of ribbons, the combination of feeding means for simultaneously moving said ribbons forwardly in flat parallel relationship; a pair of spaced revoluble heads disposed for rotation about a common axis perpendicular to the direction of travel of the ribbons fed by said feeding means; supporting means for said heads permitting axial movement thereof; resilient means yieldingly urging relative axial movement between said heads causing at least one of said heads to approach the other; folding means carried by said heads and adapted for engagement by said ribbons to have said ribbons wound thereon during folding thereof, said folding means extending axially between said heads for rotation therewith; means controlling the rotation of said heads; displacement means axially movable with said folding means; and manually operable shifting means for producing axial displacement of said folding means, said shifting means comprising a manually operable lever, a wedge controlled by said lever and engaging said displacement means; and stop means limiting the amount of such displacement.

References Cited in the file of this patent

UNITED STATES PATENTS

| | | |
|---|---|---|
| 182,071 | Hill | Sept. 12, 1876 |
| 405,411 | Heysinger | June 18, 1889 |
| 913,604 | Wright et al. | Feb. 23, 1909 |
| 1,066,126 | Lerche | July 1, 1913 |
| 1,390,957 | Hosch | Sept. 13, 1921 |